United States Patent
Harrell et al.

(10) Patent No.: US 11,628,928 B2
(45) Date of Patent: Apr. 18, 2023

(54) FORCE EQUALIZATION WITH NON-RESPONSIVE SENSOR DETECTION

(71) Applicant: Bell Textron Inc., Fort Worth, TX (US)

(72) Inventors: Clifton L. Harrell, Arlington, TX (US); Christos Bais, Keller, TX (US); Curtis R. Higgens, Arlington, TX (US); Thomas Earl Johnson, Jr., Dallas, TX (US); David Adjei, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 123 days.

(21) Appl. No.: 17/191,075

(22) Filed: Mar. 3, 2021

(65) Prior Publication Data

US 2022/0281587 A1  Sep. 8, 2022

(51) Int. Cl.
   *B64C 13/00* (2006.01)
   *B64C 13/50* (2006.01)

(52) U.S. Cl.
   CPC .......... *B64C 13/505* (2018.01); *B64C 13/503* (2013.01)

(58) Field of Classification Search
   CPC ................ B64C 13/505; B64C 13/503; B64D 2045/0085; B64D 45/00; B64D 45/0005
   See application file for complete search history.

(56) References Cited

U.S. PATENT DOCUMENTS

| | | | |
|---|---|---|---|
| 4,243,358 A | 1/1981 | Carlock et al. | |
| 6,227,481 B1 | 5/2001 | Fenny et al. | |
| 7,003,949 B2 | 2/2006 | Fenny et al. | |
| 7,059,563 B2 | 6/2006 | Huynh | |
| 7,801,170 B2* | 9/2010 | Matsumoto | H04L 5/1484 370/465 |
| 7,828,245 B2 | 11/2010 | Suisse et al. | |
| 8,583,293 B2 | 11/2013 | Soronda | |
| 11,313,391 B2 | 4/2022 | DeFusco | |

(Continued)

OTHER PUBLICATIONS

Harrell, Clifton, et al.; "Managing Force Equalization Via Force-Fight Cycle Detection"; U.S. Appl. No. 17/191,040, filed Mar. 3, 2021; 51 pages.

(Continued)

*Primary Examiner* — Ian Jen
(74) *Attorney, Agent, or Firm* — Shackelford, Bowen, McKinley & Norton, LLP

(57) ABSTRACT

In an embodiment, a method of monitoring force equalization (FEQ) sensors on a vehicle utilizing redundant actuation systems for one or more control surfaces includes determining, via a force sensor, a first measured force applied by a first actuation system in relation to a control surface, where the control surface is redundantly serviced by a plurality of actuation systems that include the first actuation system. The method also includes updating a measured-force time series for the first actuation system with the first measured force. The method also includes determining variation in at least a portion of the measured-force time series responsive to the updating. The method also includes identifying a first static condition in the measured-force time series in response to a determination that the variation in the measured-force time series is no greater than a minimum amount of variation.

20 Claims, 5 Drawing Sheets

(56) References Cited

U.S. PATENT DOCUMENTS

2010/0127132 A1    5/2010  Kirkland
2017/0283040 A1   10/2017  Judey
2021/0171186 A1    6/2021  Judey

OTHER PUBLICATIONS

Qi, Haitao, et al.; "Modelling and Simulation of Dissimilar Triplex Redundant Hybrid Actuation System"; J. Applied Sci., 13 (9); Sep. 2013; pp. 1564-1569.
Wroble, Daniel G.; "Force Fight Study in a Dual Electromechanical Actuator Configuration"; Thesis Submitted to The School of Engineering of the University of Dayton in partial fulfillment of the Requirements for The Degree of Master of Science in Mechanical Engineering; University of Dayton; Dayton, Ohio; Dec. 2017; 135 pages.

* cited by examiner

FORCE EQUALIZATION WITH NON-RESPONSIVE SENSOR DETECTION

BACKGROUND

Technical Field

The present disclosure relates generally to vehicle monitoring and more particularly, but not by way of limitation, to systems and methods for detecting and managing force cycles in force equalization systems.

History of Related Art

Redundant actuators are often used in vehicles such as aircraft to improve, for example, safety and fault tolerance. Although this redundancy can be advantageous, it can also create new problems related to uneven use of actuators and resultant fatigue. Many flight-control systems employ force-equalization algorithms to balance force exertion among redundant actuators.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of monitoring force equalization (FEQ) sensors on a vehicle utilizing redundant actuation systems for one or more control surfaces. The method includes determining, via a force sensor, a first measured force applied by a first actuation system in relation to a control surface, where the control surface is redundantly serviced by a plurality of actuation systems that include the first actuation system. The method also includes updating a measured-force time series for the first actuation system with the first measured force. The method also includes determining variation in at least a portion of the measured-force time series responsive to the updating. The method also includes identifying a first static condition in the measured-force time series in response to a determination that the variation in the measured-force time series is no greater than a minimum amount of variation. Other embodiments of this aspect include corresponding computer systems, apparatus, and computer programs recorded on one or more computer storage devices, each configured to perform the actions of the methods.

In an embodiment, another general aspect includes a vehicle computer system that includes a processor and memory. The processor and memory in combination are operable to perform a method of managing force equalization (FEQ). The method includes determining, via a force sensor, a first measured force applied by a first actuation system in relation to a control surface, where the control surface is redundantly serviced by a plurality of actuation systems that include the first actuation system. The method also includes updating a measured-force time series for the first actuation system with the first measured force. The method also includes determining variation in at least a portion of the measured-force time series responsive to the updating. The method also includes identifying a first static condition in the measured-force time series in response to a determination that the variation in the measured-force time series is no greater than a minimum amount of variation.

In an embodiment, another general aspect includes a computer-program product that further includes a non-transitory computer-usable medium having computer-readable program code embodied therein. The computer-program product is adapted to be executed to implement a method of managing force equalization (FEQ). The method includes determining, via a force sensor, a first measured force applied by a first actuation system in relation to a control surface, where the control surface is redundantly serviced by a plurality of actuation systems that include the first actuation system. The method also includes updating a measured-force time series for the first actuation system with the first measured force. The method also includes determining variation in at least a portion of the measured-force time series responsive to the updating. The method also includes identifying a first static condition in the measured-force time series in response to a determination that the variation in the measured-force time series is no greater than a minimum amount of variation.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

The present disclosure describes examples of improving the fault tolerance of force equalization (FEQ) in vehicles that utilize redundant actuation systems for control surfaces. For purposes of this patent application, the term "vehicle" includes, but is not limited to, land, water and air-based vessels or vehicles including, but not limited to, water vessels, aircraft, and land-based vehicles such as automobiles and trains. For purposes of illustration, examples will be periodically described herein relative to aircraft. It should be appreciated, however, that the principles described herein are not limited to aircraft and can similarly be applied to any other type of vehicle utilizing redundant actuation systems for control surfaces.

Figure 1:
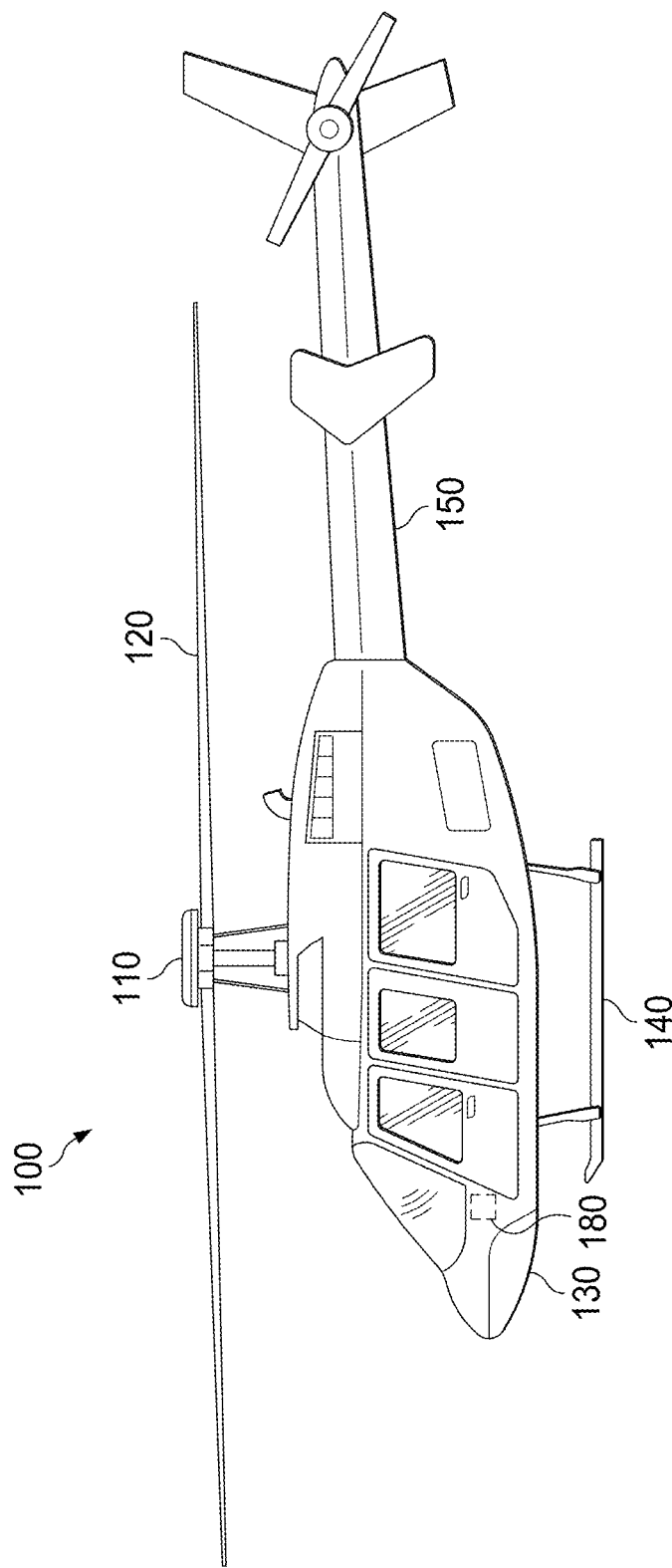
FIG. 1 illustrates an aircraft.

FIG. 1 illustrates an aircraft 100 according to one example embodiment. For illustrative purposes, the aircraft 100 is shown to be a rotorcraft. Aircraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of aircraft 100. Fuselage 130 represents the body of aircraft 100 and may be coupled to rotor system 110 such that rotor system 110 and blades 120 may move fuselage 130 through the air. Landing gear 140 supports aircraft 100 when aircraft 100 is landing and/or when aircraft 100 is at rest on the ground. Empennage 150 represents the tail section of the aircraft. A pilot may manipulate pilot flight controls in order to achieve controlled aerodynamic flight. Teachings of certain embodiments relating to rotor systems described herein may apply to rotor system 110 and/or other rotor systems, such as other tilt rotor and helicopter rotor systems. It should also be appreciated that teachings from aircraft 100 may apply to aircraft other than rotorcraft, such as airplanes and unmanned aircraft, to name a few examples. Similarly, as mentioned previously, the teachings from aircraft 100 can also be applied to other types of vehicles.

An FEQ system 180 is schematically shown in fuselage 130, but it should be appreciated that the FEQ system 180 may take a number of forms and have its components distributed throughout a variety of locations within aircraft 100. The FEQ system 180 can function, at least in part, as a vehicle monitoring system and, in a typical embodiment, is configured to control and communicate with various systems within aircraft 100. The FEQ system 180 can include, for example, one or more flight control computers and multiple actuation systems that redundantly service one or more flight control surfaces, where the one or more flight control surfaces change the flight characteristics of the aircraft such as, for example, the positions of blades 120 of FIG. 1.

In certain embodiments, the FEQ system 180 can endeavor to balance load among the multiple actuators. Further, in various embodiments, operation of multiple actuators on a control surface can introduce force fight, where instead of equally sharing load the actuators behave unequally or in opposition to each other. In certain embodiments, the FEQ system 180 can monitor the way in which FEQ is applied therein and configurably execute FEQ failure logic in defined situations. The FEQ failure logic can include, for example, disabling an actuation system responsible for creating force fight.

Figure 2:
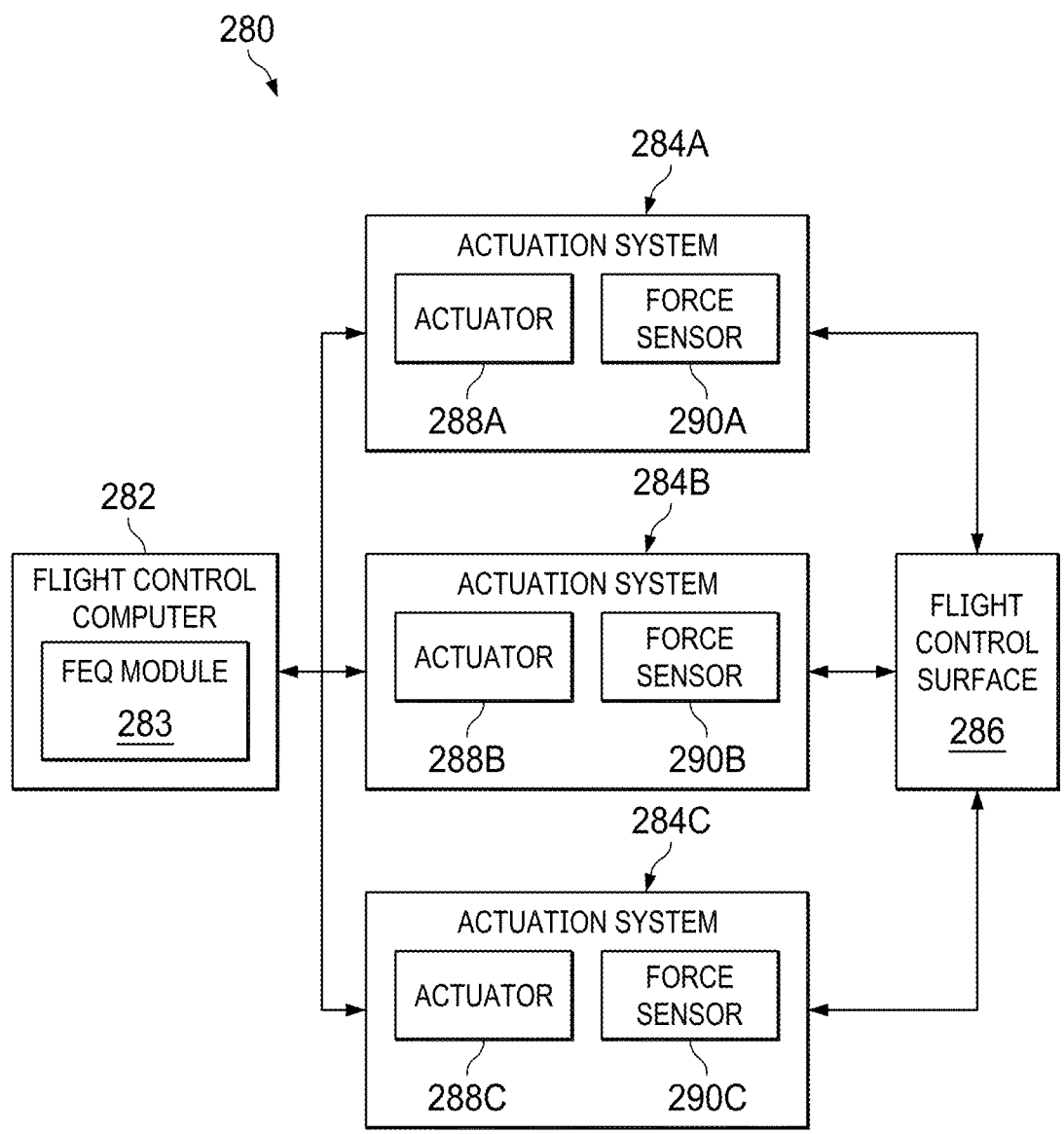
FIG. 2 illustrates an example of a force equalization (FEQ) system.

FIG. 2 illustrates an example of an FEQ system 280 that can serve, for example, as the FEQ system 180 of FIG. 1. The FEQ system 280 includes a flight control computer (FCC) 282 in communication with actuation systems 284A, 284B, and 284C (collectively, redundant actuation systems 284). The redundant actuation systems 284 redundantly service, and operate on, a flight control surface 286.

The actuation systems 284A, 284B and 284C include actuators 288A, 288B and 288C (collectively, actuators 288), respectively, and force sensors 290A, 290B and 290C (collectively, force sensors 290), respectively. In some embodiments, the redundant actuation systems 284 can each represent a single line-replaceable unit (LRU). In other embodiments, some or all components of each of the redundant actuation systems 284 can represent separate LRUs.

The actuator 288A can be, for example, a hydraulic or pneumatic actuator (e.g., a piston or ram) operable to apply force to position the flight control surface 286. The force sensor 290A can be, for example, a delta pressure sensor that detects force applied by the actuator 288A in the form of a pressure difference across the actuator 288A. In general, the actuators 288B and 288C can operate as described relative to the actuator 288A. The force sensors 290B and 290C can operate as described relative to the force sensor 290A, except that their force-sensing operation occurs with respect to the actuators 288B and 288C, respectively.

In certain embodiments, the FCC 282 can include an FEQ module 283 that balances, between the redundant actuation systems 284, force applied to the flight control surface 286. The FEQ module 283, via the force sensors 290, can continuously or periodically receive a measured force applied by each of the actuators 288 in relation to the flight control surface 286. In addition, the FEQ module 283 can continuously or periodically receive, or determine, a target force representing, for example, a target force for each of the redundant actuation systems 284. In some embodiments, the target force can represent an aggregate value determined from the measured force applied by each of the actuators 288. The aggregate value can be, for example, a mean, median, or other statistical value.

Based on the received and/or determined information, the FEQ module 283 can continuously or periodically determine an FEQ command for each of the redundant actuation systems 284 and thereafter issue such commands. For any given actuator system of the redundant actuation systems 284, the FEQ command may represent a force adjustment in the form of reduced force or increased force. In some cases, the FEQ command may indicate no change in force. An example of the FEQ module 283 will be described with respect to FIG. 4.

Figure 3:
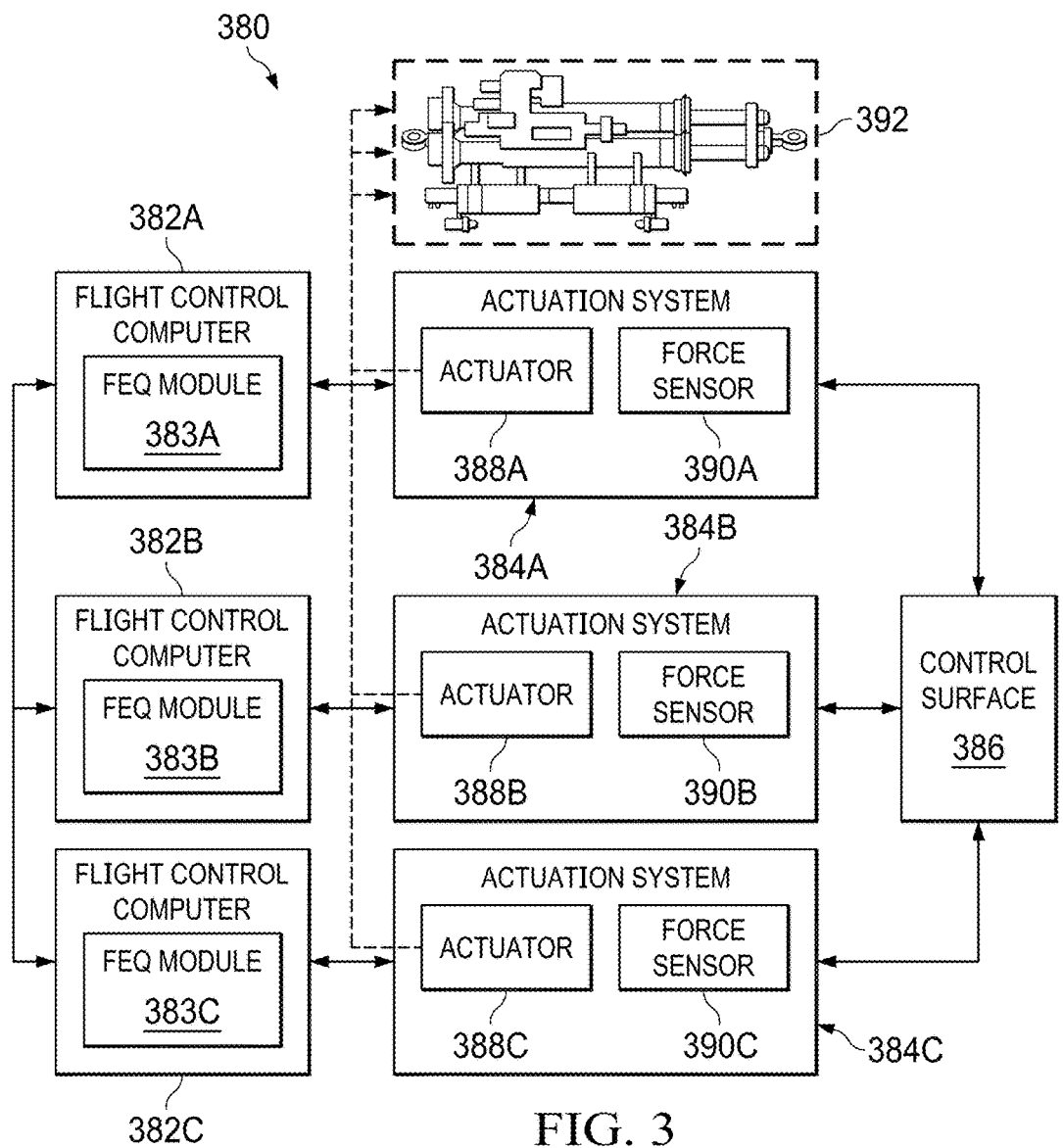
FIG. 3 illustrates an example of an FEQ system.

FIG. 3 illustrates an example of an FEQ system 380 in which multiple FCCs collaborate in providing positional control and FEQ functionality for a flight control surface 386. The FEQ system 380 can serve, for example, as the FEQ system 180 of FIG. 1. The FEQ system 380 includes three FCCs, namely, FCCs 382A, 382B and 382C (collectively, FCCs 382), three actuation systems, namely, actuation systems 384A, 384B and 384C (collectively, redundant actuation systems 384), and a flight control surface 386. In a typical embodiment, the flight control surface 386 is generally similar to the flight control surface 286 of FIG. 2 and can be operated on by the redundant actuation systems 384.

The actuation systems 384A, 384B and 384C include actuators 388A, 388B and 388C (collectively, actuators 388), respectively, and force sensors 390A, 390B and 390C (collectively, force sensors 390), respectively. In general, the redundant actuation systems 384, the actuators 388, and the force sensors 390 can operate as described relative to the redundant actuation systems 284, the actuators 288, and the force sensors 290, respectively, of FIG. 2. In some embodiments, the actuators 388 can relate to different controllable portions of a common actuation component, such as a triplex actuator 392 in the illustrated embodiment. For example, in an embodiment, the triplex actuator 392 can include multiple hydraulic cylinders and the actuators 388 can each correspond to a different hydraulic cylinder therein.

The FCCs 382A, 382B and 382C (collectively, FCCs 382) include FEQ modules 383A, 383B and 383C (collectively, FEQ modules 383), respectively. In general, the FCCs 382 and the FEQ modules 383 can operate as described relative to the FCC 282 and the FEQ module 283, respectively, of FIG. 2. In the embodiment of FIG. 3, FEQ functionality for the flight control surface 386 is distributed among the FCCs 382 such that the FCC 382A controls FEQ functionality for the actuation system 384A, the FCC 382B controls FEQ functionality for the actuation system 384B, and the FCC 382C controls FEQ functionality for the actuation system 384C. Stated somewhat differently, the FCCs 382A, 382B and 382B are responsible for determining and issuing FEQ commands for the actuation systems 384A, 384B and 384C, respectively.

As illustrated, the FCCs 382 can intercommunicate, for example, via a cross-channel data link, to share data regarding the redundant actuation systems 384. In this fashion, the FEQ modules 383 of each of the FCCs 382 thereby have access to information related to measured force for each of the redundant actuation systems 384, which information can be used to determine both a target force (e.g., a uniform target force) across the redundant actuation systems 384 and individual new FEQ commands for each of the redundant actuation systems 384. In addition, or alternatively, the FCCs 382 can intercommunicate to jointly establish the target force and the FEQ commands, with each of the FCCs 382 thereafter issuing such FEQ commands in the manner previously described.

It should be appreciated that FEQ functionality for a given control surface, such as the flight control surface 386, can be distributed to or among one, two, three, four, or any other suitable number of FCCs. In addition, for simplicity of illustration, the FEQ system 380 is described relative to a single control surface, specifically, the flight control surface 386. However, it should be appreciated that a given FCC, such as any of the FCCs 382, can control a set of redundant actuation systems similar to the redundant actuation systems 384 for each of a multitude of control surfaces.

Figure 4:
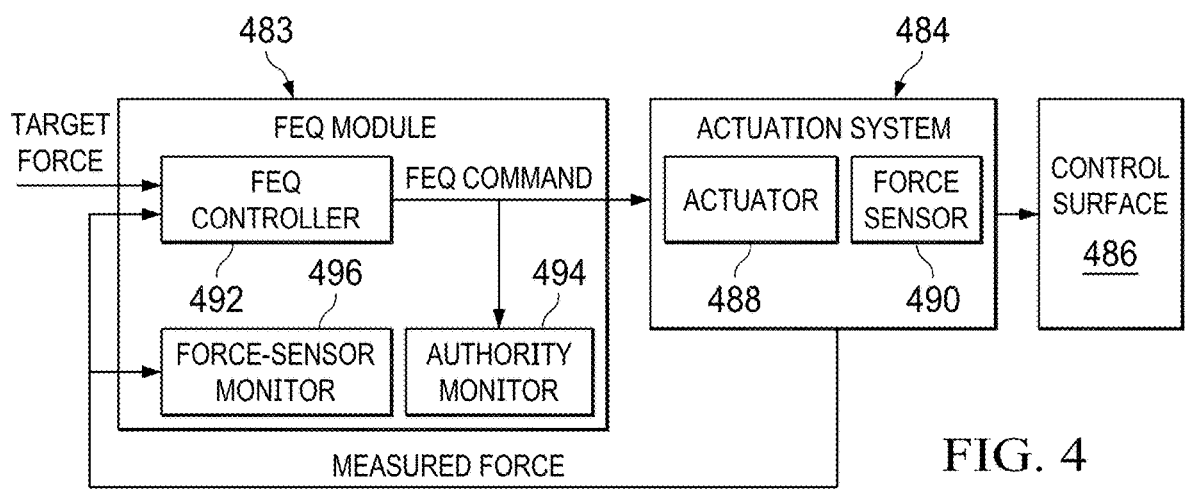
FIG. 4 illustrates an example of an FEQ module.

FIG. 4 illustrates an example of an FEQ module 483 that can correspond, for example, to any of the FEQ modules 283 and 383 of FIGS. 2 and 3, respectively. The FEQ module 483 includes an FEQ controller 492, an authority monitor 494, and a force-sensor monitor 496. In the illustrated embodiment, the FEQ module 483 controls FEQ functionality for an actuation system 484 relative to a flight control surface 486. The actuation system 484 includes an actuator 488 and a force sensor 490. Although only the actuation system 484 is illustrated in FIG. 4 for simplicity, it should be appreciated that the flight control surface 486 is assumed to be redundantly operated by multiple actuation systems in similar fashion to the embodiments described relative to FIGS. 2-3.

The FEQ controller 492, via the force sensor 490, can continuously or periodically receive a measured force applied by the actuation system 484 as well as measured force applied by other actuation systems involved in redundantly servicing the flight control surface 486. In addition, the FEQ controller 492 continuously or periodically receives, or determines, a target force for the actuation system 484. Based on this information, the FEQ controller 492 can continuously or periodically determine an FEQ command for the actuator 488 and thereafter issue such command. As described previously, the FEQ command may represent a force adjustment, for example, in the form of reduced force or increased force. In some cases, the FEQ command may indicate no change in force.

The authority monitor 494 is operable to monitor, for example, each FEQ command issued by the FEQ controller 492, and to determine if the FEQ module 483 has exceeded its FEQ authority. In various embodiments, FEQ authority can be defined using an authority threshold that is expressed, for example, in terms of inches of actuator or another suitable metric. In certain embodiments, if a given FEQ command from the FEQ controller 492 instructs a force adjustment that is in excess of the authority threshold, the FEQ controller 492 may be determined to have exceeded its FEQ authority, at which point the authority monitor 494 can cause FEQ failure logic to be executed. In many cases, a force adjustment in excess of the authority threshold is indicative of a failure to balance, and hence a force fight. As part of executing the FEQ failure logic, the authority monitor 494 can cause the actuation system 484 to be disabled, such that it no longer participates as a redundant actuator for the flight control surface 486. In some embodiments, executing the FEQ failure logic can result in FEQ being disabled for a given control surface. Other options for the FEQ failure logic will be apparent to one skilled in the art after a detailed review of the present disclosure.

In various embodiments, the force-sensor monitor 496 can be used to detect and address other types of FEQ faults that manifest in a more subtle fashion than in a command in excess of authority. The force-sensor monitor 496 can monitor measured force as it is continuously or periodically received, for example, from the force sensor 490, and progressively build a measured-force time series for the actuation system 484. As the measured-force time series is updated, the force-sensor monitor 496 can analyze variation in the measured-force time series in order to detect static conditions in the measured-force time series. The static condition can be configurably defined. For example, the static condition can be defined as no more than a minimum amount of variation over a configurable interval (e.g., variation of less than 200 pound-force per square inch (PSI) over a five-minute interval). In response to identifying a static condition, the force-sensor monitor 496 can test the force sensor 490, for example, by sending a command stimulus to at least the actuation system 484. In various embodiments, the force sensor 490 can be classified as non-responsive if the command stimulus does not produce an expected change in measured force, at which point FEQ failure logic can be triggered. Example operation of the force-sensor monitor 496 will be described in greater detail relative to FIG. 5.

Figure 5:
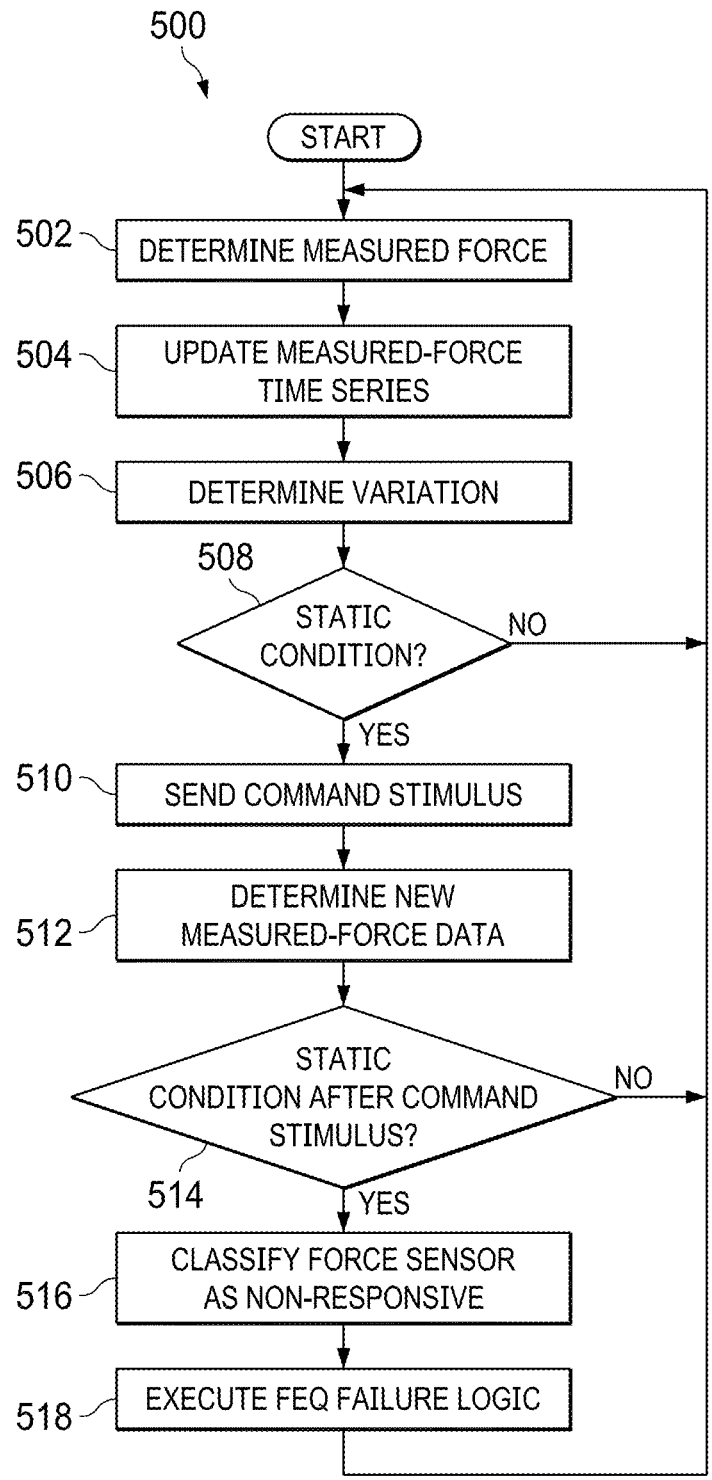
FIG. 5 illustrates an example of a process for improving fault tolerance in FEQ systems by detecting non-responsive force sensors.

FIG. 5 illustrates an example of a process 500 for improving fault tolerance in FEQ systems by monitoring force sensors. In a typical embodiment, the process 500 can be executed with respect to a force sensor of an actuation system. For illustrative purposes, the process 500 will be described relative to the force sensor 490 of the actuation system 484. It should be appreciated, however, that the process 500 can be executed in parallel for each of a plurality of force sensors that may be in use in a given FEQ system. In addition, although the process 500 can be executed by any number of different components, to simplify discussion, the process 500 will be described as being performed by the force-sensor monitor 496 of FIG. 4.

At block 502, the force-sensor monitor 496 determines, via the force sensor 490, a measured force applied by the actuation system 484 in relation to the flight control surface 486. As described relative to FIGS. 2-3, the flight control surface 486 can be redundantly served by a plurality of actuation systems, inclusive of the actuation system 484. In a typical embodiment, the force-sensor monitor 496 determines the measured force on a continuous or periodic basis by receiving the measured force from the force sensor 490.

At block 504, the force-sensor monitor 496 updates a measured-force time series for the force sensor 490 with the measured force determined at the block 502. If the measured force received at the block 502 represents the first such measured force, the block 502 can include creating the measured-force time series. In various embodiments, the block 504 can involve the force-sensor monitor 496 adding the measured force to a data structure representing the measured-force time series.

At block 506, the force-sensor monitor 496 determines variation in at least a portion of the measured-force time series over an interval thereof. For example, the force-sensor monitor 496 can determine a difference between a maximum and minimum value over an interval of the measured-force time series. One skilled in the art will appreciate that variation can also be determined or measured in other ways without deviating from the principles described herein.

At decision block 508, the force-sensor monitor 496 determines whether a static condition exists in the measured-force time series. As described previously, criteria for the existence of a static condition can be configurably defined. For example, the static condition can be defined as no more than a minimum amount of variation over a configurable interval (e.g., variation of less than 200 PSI over a five-minute interval). In certain embodiments, the decision block 508 can involve comparing, for example, a determined variation (e.g., a difference between maximum and minimum values) to the minimum amount of variation. According to this example, if the determined difference is no greater than the minimum of amount of variation, a static condition can be determined to exist. If the decision block 508 results in an affirmative determination, the process 500 proceeds to block 510. Otherwise, the process 500 returns to the block 502 and executes as described previously.

At block 510, the force-sensor monitor 496 sends a command stimulus to the actuation system 484. In a typical embodiment, the command stimulus instructs the actuator 488 to move in a way that is expected to cause the force sensor 490 to produce a change in its measured-force data, such that the minimum amount of variation described above is exceeded. At block 512, the force-sensor monitor 496 determines new measured-force data. In various embodiments, the new measured-force data can include one, two, three or any number of representative values from the force sensor 490. In general, the new measured-force data is a sufficient number of values for determining whether a static condition exists after the command stimulus.

At decision block 514, the force-sensor monitor 496 determines whether a static condition exists in the new measured-force data (i.e., after the command stimulus). A negative determination at the decision block 514 generally means that the force sensor 490 is responsive. A positive determination, however, generally means that it is appropriate to classify the force sensor 490 as non-responsive. If the decision block 514 results in a negative determination, the force sensor 490 is classified or treated as responsive and the process 500 returns to the block 502 and executes as described previously. Otherwise, if the decision block 514 results in a positive determination, the process 500 proceeds to block 516, where the force sensor 490 is classified as non-responsive.

At block 518, the force-sensor monitor 496 executes FEQ failure logic. In general, the FEQ failure logic can include any routine that attempts to report, remediate, or somehow address the non-responsive classification of the force sensor 490. In some embodiments, the FEQ failure logic can proceed in a stepwise fashion, with progressively more severe measures being taken in each iteration of the block 518. In some embodiments, execution of the FEQ failure logic results in disabling the actuation system 484, such that it is no longer involved in redundantly servicing the flight control surface 486.

From block 518, the process 500 returns to the block 502 and executes as described previously. In various embodiments, the process 500 can continue indefinitely, for example, until a conclusion of a mission or trip, shutdown of the aircraft, termination by an administrator or user, or whenever other suitable stop criteria is satisfied. In addition, in some embodiments, execution of the FEQ failure logic can result in termination of the process 500.

For simplicity of description, the process 500 is described relative to a command stimulus that is sent to a single actuation system, namely, the actuation system 484, after a static condition thereof has been identified. In some embodiments, some or all of the process 500 can be performed relative to all or any combination of the multiple actuation systems involved in redundantly servicing the flight control surface 486. For example, after a static condition has been identified relative to the actuation system 484, blocks 510-518 can be performed in a sequential pattern for each of the multiple actuation systems involved in servicing the flight control surface 486 in an effort to determine whether the static condition represents non-responsiveness. Other variations will be apparent to one skilled in the art after a detailed review of the present disclosure.

Figure 6:
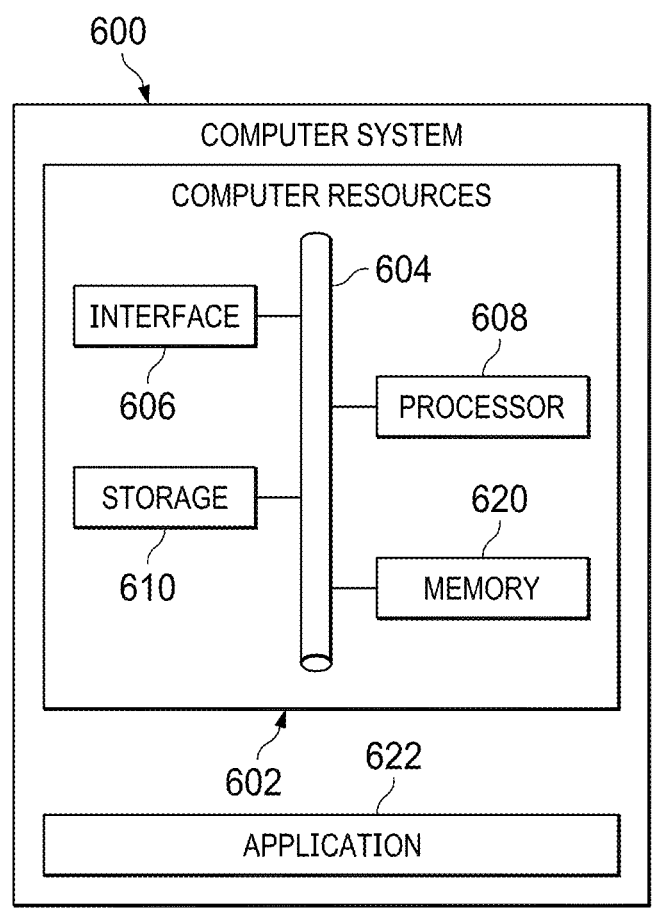
FIG. 6 illustrates an example of a computer system.

FIG. 6 illustrates an example of a computer system 600. In some cases, the computer system 600 can be representative of a computer such as, for example, the FCC 282 of FIG. 2 and/or any of the FCCs 382 of FIG. 3. The computer system 600 includes an application 622 operable to execute on computer resources 602. The application 622 can include, for example, logic for executing functionality of the FEQ module 283, any of the FEQ modules 383, the FEQ module 483, and/or a functionality of a component of any of the foregoing. In particular embodiments, the computer system 600 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 600 may include any suitable physical form, configuration, number, type and/or layout. As an example, and not by way of limitation, the computer system 600 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 600 may include one or more computer systems; be unitary or distributed; span multiple locations; span multiple machines; or reside in a cloud, which may include one or more cloud components in one or more networks.

In the depicted embodiment, the computer system 600 includes a processor 608, memory 620, storage 610, interface 606, and bus 604. Although a particular computer system is depicted having a particular number of particular components in a particular arrangement, this disclosure contemplates any suitable computer system having any suitable number of any suitable components in any suitable arrangement.

Processor 608 may be a microprocessor, controller, or any other suitable computing device, resource, or combination of hardware, software and/or encoded logic operable to execute, either alone or in conjunction with other components, (e.g., memory 620), the application 622. Such functionality may include providing various features discussed herein. In particular embodiments, processor 608 may include hardware for executing instructions, such as those making up the application 622. As an example, and not by way of limitation, to execute instructions, processor 608 may retrieve (or fetch) instructions from an internal register, an internal cache, memory 620, or storage 610; decode and execute them; and then write one or more results to an internal register, an internal cache, memory 620, or storage 610.

In particular embodiments, processor 608 may include one or more internal caches for data, instructions, or addresses. This disclosure contemplates processor 608 including any suitable number of any suitable internal caches, where appropriate. As an example, and not by way of limitation, processor 608 may include one or more instruction caches, one or more data caches, and one or more translation lookaside buffers (TLBs). Instructions in the instruction caches may be copies of instructions in memory 620 or storage 610 and the instruction caches may speed up retrieval of those instructions by processor 608. Data in the data caches may be copies of data in memory 620 or storage 610 for instructions executing at processor 608 to operate on; the results of previous instructions executed at processor 608 for access by subsequent instructions executing at processor 608, or for writing to memory 620, or storage 610; or other suitable data. The data caches may speed up read or write operations by processor 608. The TLBs may speed up virtual-address translations for processor 608. In particular embodiments, processor 608 may include one or more internal registers for data, instructions, or addresses. Depending on the embodiment, processor 608 may include any suitable number of any suitable internal registers, where appropriate. Where appropriate, processor 608 may include one or more arithmetic logic units (ALUs); be a multi-core processor; include one or more processors 608; or any other suitable processor.

Memory 620 may be any form of volatile or non-volatile memory including, without limitation, magnetic media, optical media, random access memory (RAM), read-only memory (ROM), flash memory, removable media, or any other suitable local or remote memory component or components. In particular embodiments, memory 620 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 620 may include one or more memories 220, where appropriate. Memory 620 may store any suitable data or information utilized by the computer system 600, including software embedded in a computer readable medium, and/or encoded logic incorporated in hardware or otherwise stored (e.g., firmware). In particular embodiments, memory 620 may include main memory for storing instructions for processor 608 to execute or data for processor 608 to operate on. In particular embodiments, one or more memory management units (MMUs) may reside between processor 608 and memory 620 and facilitate accesses to memory 620 requested by processor 608.

As an example, and not by way of limitation, the computer system 600 may load instructions from storage 610 or another source (such as, for example, another computer system) to memory 620. Processor 608 may then load the instructions from memory 620 to an internal register or internal cache. To execute the instructions, processor 608 may retrieve the instructions from the internal register or internal cache and decode them. During or after execution of the instructions, processor 608 may write one or more results (which may be intermediate or final results) to the internal register or internal cache. Processor 608 may then write one or more of those results to memory 620. In particular embodiments, processor 608 may execute only instructions in one or more internal registers or internal caches or in memory 620 (as opposed to storage 610 or elsewhere) and may operate only on data in one or more internal registers or internal caches or in memory 620 (as opposed to storage 610 or elsewhere).

In particular embodiments, storage 610 may include mass storage for data or instructions. For example, in various embodiments, storage 610 can store all or a portion of the contents of the data store(s) 208 of FIG. 2. As an example, and not by way of limitation, storage 610 may include a hard disk drive (HDD), a floppy disk drive, flash memory, an optical disc, a magneto-optical disc, magnetic tape, or a Universal Serial Bus (USB) drive or a combination of two or more of these. Storage 610 may include removable or non-removable (or fixed) media, where appropriate. Storage 610 may be internal or external to the computer system 600, where appropriate. In particular embodiments, storage 610 may be non-volatile, solid-state memory. In particular embodiments, storage 610 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 610 may take any suitable physical form and may include any suitable number or type of storage. Storage 610 may include one or more storage control units facilitating communication between processor 608 and storage 610, where appropriate.

In particular embodiments, interface 606 may include hardware, encoded software, or both providing one or more interfaces for communication (such as, for example, packet-based communication) among any networks, any network devices, and/or any other computer systems. As an example, and not by way of limitation, communication interface 606 may include a network interface controller (NIC) or network adapter for communicating with an Ethernet or other wirebased network and/or a wireless NIC (WNIC) or wireless adapter for communicating with a wireless network.

Depending on the embodiment, interface 606 may be any type of interface suitable for any type of network for which computer system 600 is used. As an example, and not by way of limitation, computer system 600 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 600 may include any suitable interface 606 for any one or more of these networks, where appropriate.

In some embodiments, interface 606 may include one or more interfaces for one or more I/O devices. One or more of these I/O devices may enable communication between a person and the computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 606 for them. Where appropriate, interface 606 may include one or more drivers enabling processor 608 to drive one or more of these I/O devices. Interface 606 may include one or more interfaces 606, where appropriate.

Bus 604 may include any combination of hardware, software embedded in a computer readable medium, and/or encoded logic incorporated in hardware or otherwise stored (e.g., firmware) to couple components of the computer system 600 to each other. As an example, and not by way of limitation, bus 604 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 604 may include any number, type, and/or configuration of buses 604, where appropriate. In particular embodiments, one or more buses 604 (which may each include an address bus and a data bus) may couple processor 608 to memory 620. Bus 604 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 608 (such as, for example, one or more internal registers or caches), one or more portions of memory 620, one or more portions of storage 610, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof.

In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of monitoring force equalization (FEQ) sensors on a vehicle utilizing redundant actuation systems for one or more control surfaces, the method comprising, by a computer system for a vehicle:
    determining, via a force sensor, a first measured force applied by a first actuation system in relation to a control surface, wherein the control surface is redundantly serviced by a plurality of actuation systems comprising the first actuation system;
    updating a measured-force time series for the first actuation system with the first measured force;
    determining variation in at least a portion of the measured-force time series responsive to the updating; and
    identifying a first static condition in the measured-force time series in response to a determination that the variation in the measured-force time series is no greater than a minimum amount of variation.

2. The method of claim 1, wherein:
    the determining the variation comprises determining a difference between maximum and minimum values over an interval of the measured-force time series; and
    the identifying the first static condition comprises:
        comparing the determined difference to the minimum amount of variation; and
        determining the first static condition to exist responsive to the determined difference being no greater than the minimum amount of variation.

3. The method of claim 1, comprising:
    sending a command stimulus to at least the first actuation system responsive to the first static condition; and
    determining, via the force sensor, new measured-force data comprising a second measured force applied by the first actuation system responsive to the sending of the command stimulus.

4. The method of claim 3 comprising, responsive to a determination that no static condition exists in the new measured-force data, treating the force sensor as responsive.

5. The method of claim 3, wherein the sending comprises sending the command stimulus to each of the plurality of actuation systems in a sequential pattern.

6. The method of claim 3, comprising:
    identifying a second static condition in the new measured-force data; and
    classifying the force sensor as non-responsive in response to the second static condition.

7. The method of claim 6, comprising executing FEQ failure logic in response to the classifying the force sensor as non-responsive.

8. The method of claim 7, wherein the executing comprises disabling the first actuation system.

9. The method of claim 2, wherein the force sensor comprises a delta pressure sensor.

10. The method of claim 1, wherein the plurality of actuation systems comprise a second actuation system and a third actuation system, and where the first, second, and third actuation systems each comprise an actuator forming part of a common actuation component.

11. The method of claim 1, comprising:
    monitoring FEQ commands issued by the computer system to the first actuation system; and
    responsive to a determination that an FEQ command exceeds FEQ authority of the computer system, executing FEQ failure logic.

12. The method of claim 1, wherein the vehicle is an aircraft.

13. A vehicle computer system comprising a processor and memory, wherein the processor and the memory in combination are operable to perform a method of managing force equalization (FEQ), the method comprising:
    determining, via a force sensor, a first measured force applied by a first actuation system in relation to a control surface, wherein the control surface is redundantly serviced by a plurality of actuation systems comprising the first actuation system;
    updating a measured-force time series for the first actuation system with the first measured force;
    determining variation in at least a portion of the measured-force time series responsive to the updating; and
    identifying a first static condition in the measured-force time series in response to a determination that the variation in the measured-force time series is no greater than a minimum amount of variation.

14. The vehicle computer system of claim 13, wherein:
    the determining the variation comprises determining a difference between maximum and minimum values over an interval of the measured-force time series; and
    the identifying the first static condition comprises:
        comparing the determined difference to the minimum amount of variation; and
        determining the first static condition to exist responsive to the determined difference being no greater than the minimum amount of variation.

15. The vehicle computer system of claim 13, the method comprising:
sending a command stimulus to at least the first actuation system responsive to the first static condition; and
determining, via the force sensor, new measured-force data comprising a second measured force applied by the first actuation system responsive to the sending of the command stimulus.

16. The vehicle computer system of claim 15, the method comprising, responsive to a determination that no static condition exists in the new measured-force data, treating the force sensor as responsive.

17. The vehicle computer system of claim 15, the method comprising:
identifying a second static condition in the new measured-force data; and
classifying the force sensor as non-responsive in response to the second static condition.

18. The vehicle computer system of claim 17, the method comprising executing FEQ failure logic in response to the classifying the force sensor as non-responsive.

19. The vehicle computer system of claim 13, wherein the vehicle computer system comprises a flight control computer.

20. A computer-program product comprising a non-transitory computer-usable medium having computer-readable program code embodied therein, the computer-readable program code adapted to be executed to implement a method of managing force equalization (FEQ), the method comprising:
determining, via a force sensor, a first measured force applied by a first actuation system in relation to a control surface, wherein the control surface is redundantly serviced by a plurality of actuation systems comprising the first actuation system;
updating a measured-force time series for the first actuation system with the first measured force;
determining variation in at least a portion of the measured-force time series responsive to the updating; and
identifying a first static condition in the measured-force time series in response to a determination that the variation in the measured-force time series is no greater than a minimum amount of variation.

* * * * *